July 27, 1926.
H. W. BENTON
SHIELD
Filed August 27, 1924    2 Sheets-Sheet 1
1,594,238
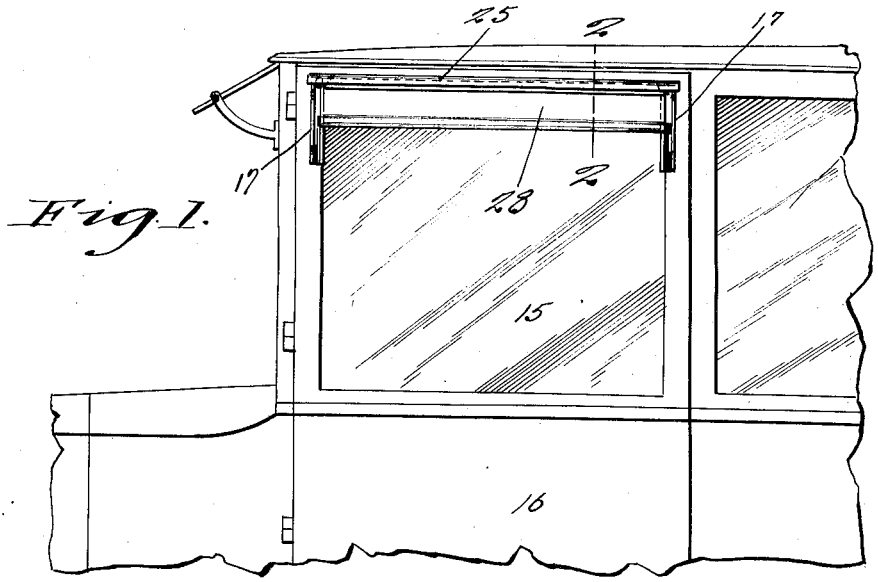
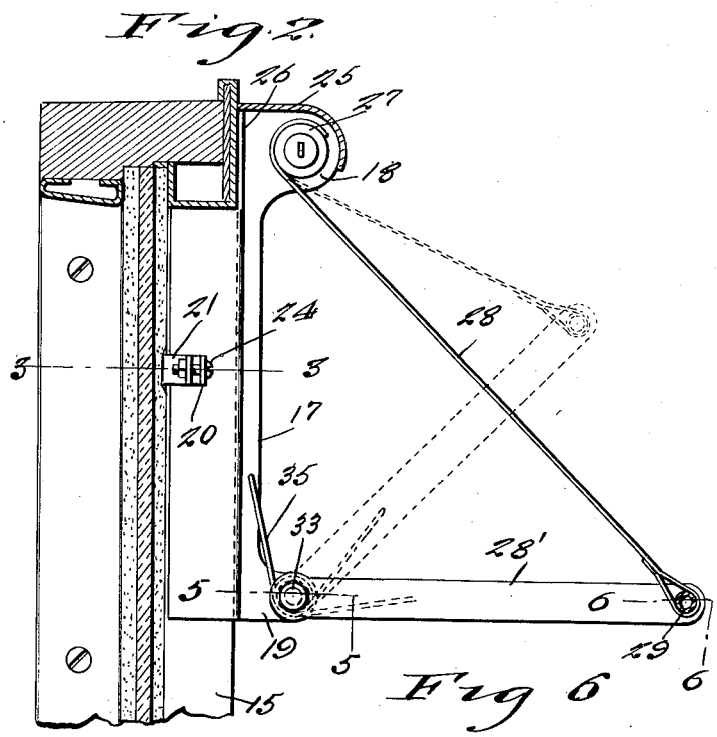
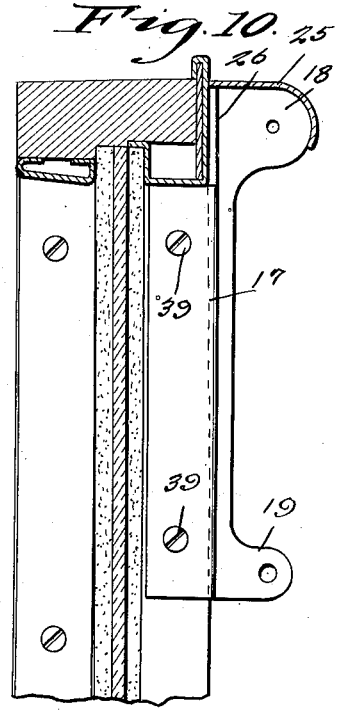
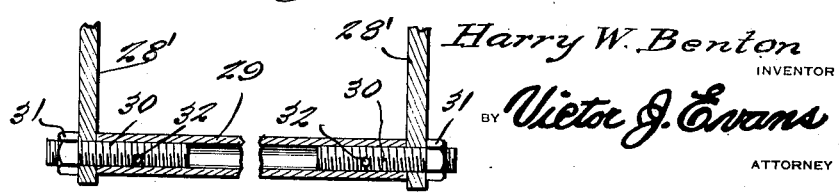
Harry W. Benton
INVENTOR
BY Victor J. Evans
ATTORNEY
WITNESS:

July 27, 1926.
H. W. BENTON
SHIELD
Filed August 27, 1924  2 Sheets-Sheet 2
1,594,238
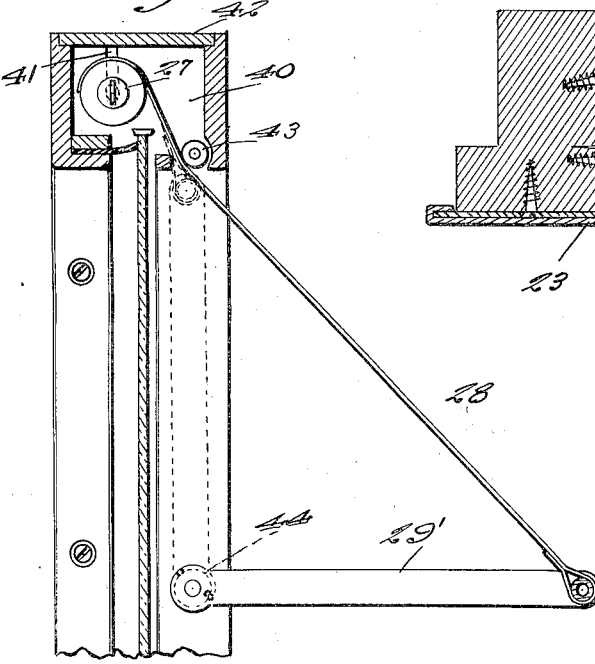
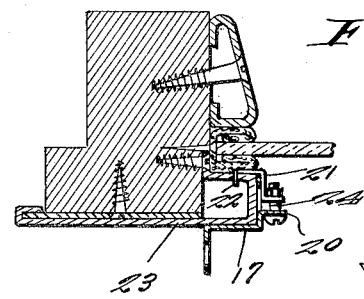
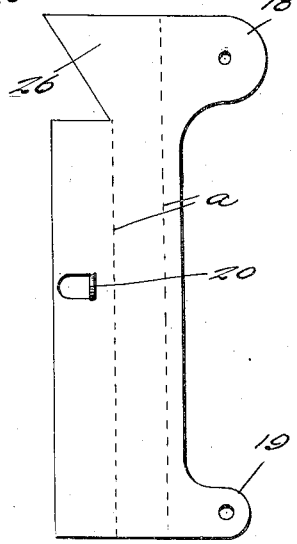
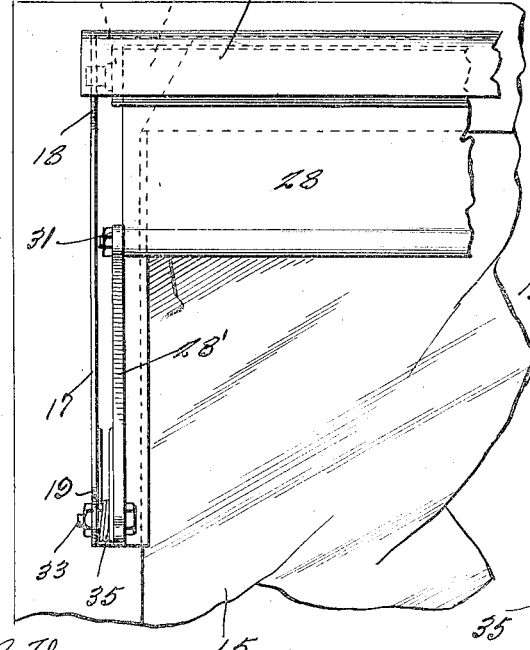
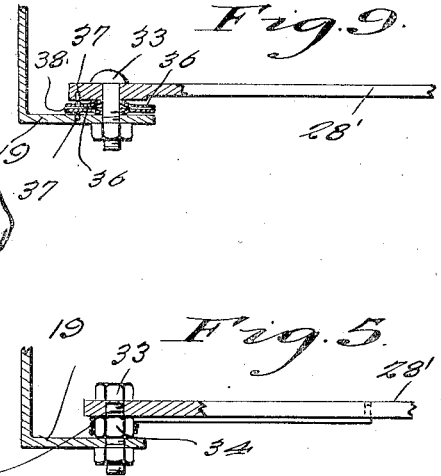
Harry W. Benton, INVENTOR Patented July 27, 1926.

1,594,238

UNITED STATES PATENT OFFICE.

HARRY W. BENTON, OF ELMIRA, NEW YORK.

SHIELD.

Application filed August 27, 1924. Serial No. 734,505.

This invention relates to improvements in vehicles and has particular relation to protecting devices or shields which may be either attached to or built into the vehicle for the purpose of shielding the occupants from sun or rain, the invention being especially adapted for application to closed automobiles.

An object of the present invention is the provision of a combined sun and rain shield which may be attached to or built into the frame of a door or window opening in such manner as not to detract from the appearance of the automobile, the shield being constructed so that it may be normally arranged in an inactive position, but is capable of being quickly and conveniently moved to an extended or active position.

Another object of the invention is the provision of a shield of this character which is normally housed above the top of a door or window opening and is held in such position in a manner to prevent rattling or objectionable noises and is capable of being adjustably extended so as to provide a shield which overhangs the top of the opening in a manner to prevent the entrance of sun or rain and at the same time permit ventilation.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation showing a portion of an automobile with the invention applied.

Figure 2 is an enlarged sectional view taken substantially on the line 2—2 of Figure 1.

Figure 3 is a section on the line 3—3 of Figure 2.

Figure 4 is an enlarged fragmentary elevation showing one end of the shield.

Figure 5 is an enlarged fragmentary sectional view on the line 5—5 of Figure 2.

Figure 6 is an enlarged fragmentary section on the line 6—6 of Figure 2.

Figure 7 is an elevation of a blank from which one of the bearing brackets is formed.

Figure 8 is a view similar to Figure 2 but showing the manner in which the shield may be built into the automobile.

Figure 9 is a view similar to Figure 5 showing a modified form of the invention.

Figure 10 is a sectional view illustrating a different manner of securing the bearing brackets in place.

Referring to the drawings in detail wherein like characters of reference denote corresponding parts, the invention is shown as applied to the top of the window 15 of a door 16 of the body of a closed automobile although it is obvious that it may be otherwise applied. It may be built into the frame of the window or attached to the frame and in the latter event includes bearing brackets 17 which are formed from a single blank of material shaped as shown in Figure 7 of the drawings. The blank is bent upon the dotted lines $a$ so as to provide a transversely substantially V-shaped member having upper apertured ears 18 and lower apertured ears 19. An apertured lug 20 is also struck up from the bracket 17.

One of these brackets is adapted to be secured to the opposite side edges of the window opening and for this purpose there is provided substantially Z-shaped clamping strips 21, the inner ends of which are provided with right angled extensions 22 which enter openings provided in the frame 23 of the window. The opposite ends of the clamping strips 21 are provided with openings for the passage of bolts 24 which also pass through the apertured ears 20 and which are adjusted to clamp the bearing brackets 17 in position upon the window frame with the ears 18 and 19 projecting outwardly. A curved connecting strip 25 extends horizontally across the top of the window opening and has its opposite ends connected to the ears 18 in any suitable manner, the inner edge of this strip also bearing upon the upper edge of a pointed extension 26 which is included in each of the brackets 17.

A housing is thus provided for a spring actuated curtain roller 27 whose opposite ends enter openings in the ears 18. This roller may be of the type commonly known as the Hartshorn spring roller.

The curtain which is indicated at 28 may be of any suitable material which will resist the action of rain or sun and the outer end of this curtain is engaged by a U-shaped frame which includes spaced parallel arms 28 and a connecting bar 29. The length of this bar is adjustable so as to regulate the width of the frame and for this purpose the arms 28 are connected to the opposite ends of the bar by threaded studs 30 which pass through the bars. Nuts 31 serve to secure the bars in place, while the threaded studs are secured within the bar 29 by keys 32.

The inner ends of the arms 29 are pivotally secured to the ears 19 by means of pivot bolts 33, the arms being spaced from the ears by nuts or other spacing elements 34. A spring 35 which is wound around each of the nuts 34 has one end secured to the bracket 17 and its opposite end secured to the arm 28, so that the arms will be yieldingly forced outward. The springs 35 will thus act to hold the curtain taut when the shield is extended so as to prevent upward creeping of the curtain due to the action of the wind when the automobile is in motion.

Other means may be provided for preventing this upward movement, one of which is shown in Figure 9 of the drawings. This consists of oppositely curved spring washers 36 which are positioned upon the pivot bolt 33 between the arm 29 and the ear 19, these washers having pins or lugs 37 extending therefrom which engage sockets provided respectively in the arm 29 and ear 19. The opposed faces of the spring washers 36 are roughened or serrated as shown at 38 to prevent accidental relative movement.

In Figure 10 there is illustrated a different means of securing the brackets 17 to the window frame. This consists of screws 39 which pass through openings provided in the brackets and in the window frame 23. In applying the brackets to metal frames, machine screws are utilized, while wood screws may be passed through openings provided in the bracket when the invention is applied to wooden frames.

In Figure 8 of the drawings the invention is illustrated as built into the window frame and for this purpose the frame is provided with a pocket or compartment 40, the opposite ends of which are provided with slots 41 for the accommodation of the roller 27, the upper ends of the slots 41 being closed by the top 42 of the door or window frame. The roller 43 acts to guide the curtain and prevent friction as the latter is moved inward or outward. In this form of the invention the arms 29' of the U-shaped frame which is attached to the outer end of the curtain 28 are normally housed within the window frame, the inner ends of the said arms being provided with laterally offset hubs or trunnions which enter sockets provided in the opposite edges of the window frame. A coiled spring 44 similar to the spring 35 is arranged to urge the U-shaped frame downward to hold the curtain 28 taut.

In the form of the invention illustrated in Figure 2, the rod 29 will frictionally engage the rolled curtain so as to prevent vibration and rattling, while in the form shown in Figure 8, frictional engagement between the rod 29 and roller 43 may be provided for this purpose.

Where the frictional holding means as illustrated in Figure 9 is employed, the dogs usually employed in spring roller curtains may be dispensed with.

The invention is susceptible of various changes in its form, proportions and minor details of construction and the right is herein reserved to make such changes as properly fall within the scope of the appended claims.

Having described the invention what is claimed is:—

1. The combination with a vehicle body having a window therein, of a spring actuated curtain, curtain brackets formed from a single sheet of metal and shaped to provide a substantially Z-shaped cross section for engagement over the corners of the window opening and upper and lower apertured bearing lugs extending from the opposite ends of the brackets, a spring actuated curtain roller mounted in the upper bearing lugs, a curtain wound upon the roller, a substantially U-shaped frame secured to the free end of the curtain, means for pivotally securing the ends of the frame to the lower bearing lugs whereby the curtain may be extended downward and outward and means for holding the curtain against accidental reverse movement.

2. The combination with a vehicle body having a window therein, of a spring actuated curtain, curtain brackets formed from a single sheet of metal and shaped to provide a substantially Z-shaped cross section for engagement over the corners of the window opening and upper and lower apertured bearing lugs extending from the opposite ends of the bracket, right angularly disposed apertured lugs struck from the bearing brackets intermediate the upper and lower bearing lugs, Z-shaped strips extending transversely of the frame of the window, said strips having their inner ends detachably engaged with the frame and their outer ends detachably secured to the intermediate apertured lugs, a spring actuated curtain roller mounted in the upper bearing lugs, a curtain wound upon the roller, a substantially U-shaped frame secured to the free end of the curtain, means for pivotally securing the ends of the frame to the lower bearing lugs whereby the curtain may be extended outward and downward and means for holding the curtain against accidental reverse movement.

In testimony whereof I affix my signature.

HARRY W. BENTON.